United States Patent [19]

Seppala

[11] 4,433,509
[45] Feb. 28, 1984

[54] WINDOW REGULATOR

[75] Inventor: Earl E. Seppala, Hockessin, Del.

[73] Assignee: E. I. Du Pont de Nemours and Company, Wilmington, Del.

[21] Appl. No.: 446,228

[22] Filed: Dec. 2, 1982

[51] Int. Cl.³ .............................................. E05F 11/48
[52] U.S. Cl. ...................................................... 49/352
[58] Field of Search ........................... 49/348, 349, 352

[56] References Cited

U.S. PATENT DOCUMENTS

| | | |
|---|---|---|
| 1,627,697 | 5/1927 | Fredericks. |
| 1,628,672 | 5/1927 | Kurscheidt et al. ............... 49/352 X |
| 2,832,590 | 4/1958 | Youngberg ......................... 268/104 |
| 3,702,041 | 11/1972 | Podolan ................................. 49/348 |
| 3,834,080 | 9/1974 | Lystad ................................... 49/348 |

Primary Examiner—Philip C. Kannan

[57] ABSTRACT

A regulator for closures, and especially vehicle mounted windows, having a rigid track, one end of which is formed in a spiral configuration and which contains a polymeric power transmission tape, a rotatably mounted power transmission arm and a power transmission block slidably connected to the power transmission arm and connected to the end of the polymeric tape to move the tape within the spiral formed portion of the track, the other end of the tape being attached to the closure.

5 Claims, 6 Drawing Figures

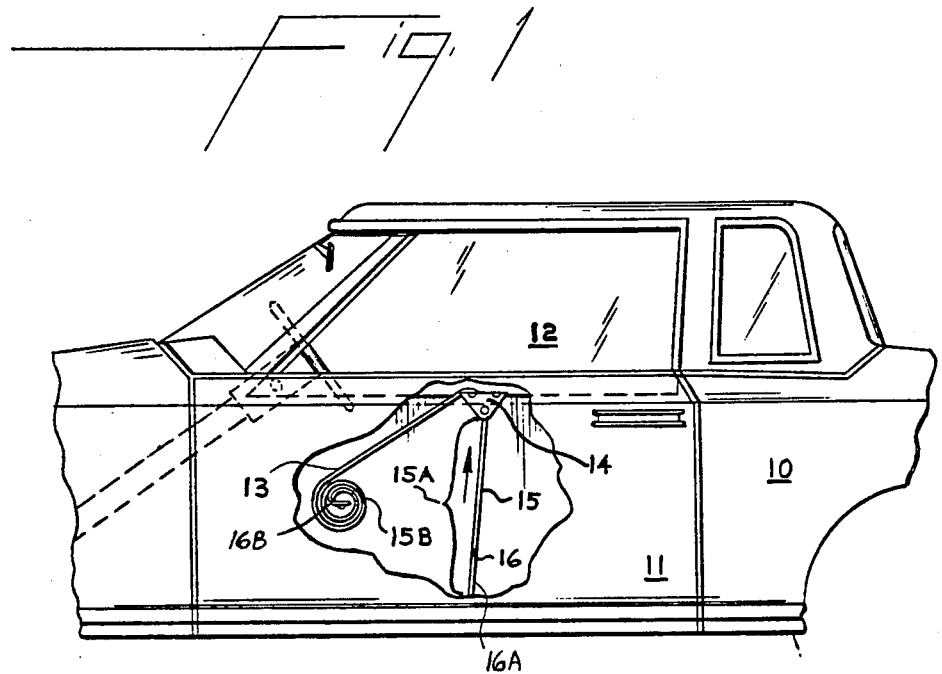
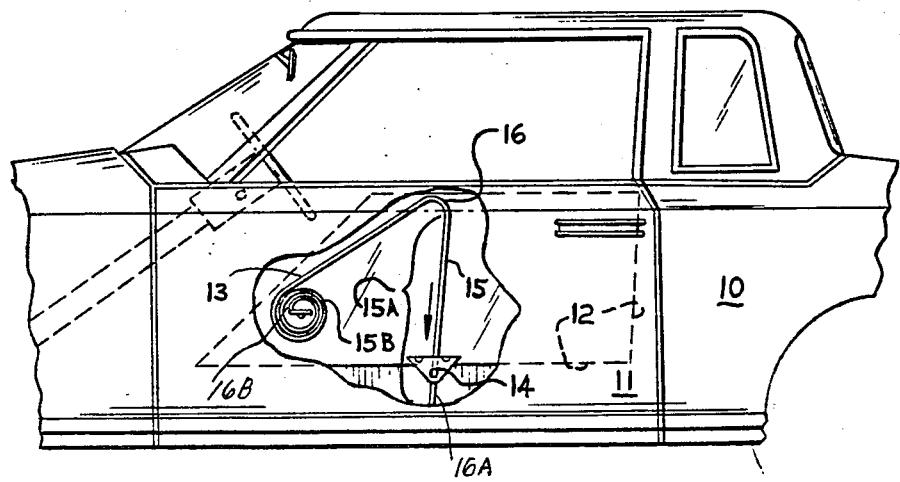

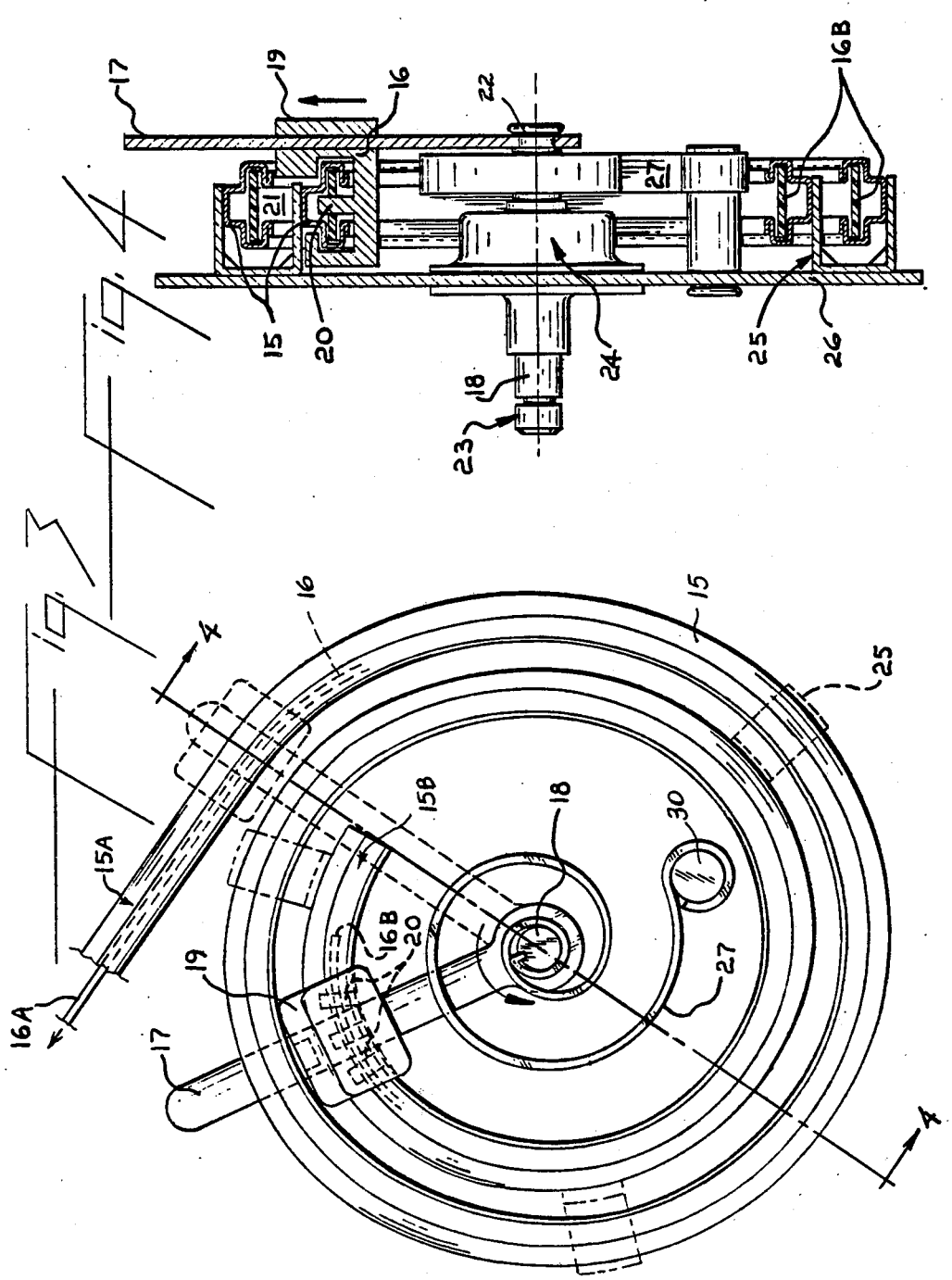

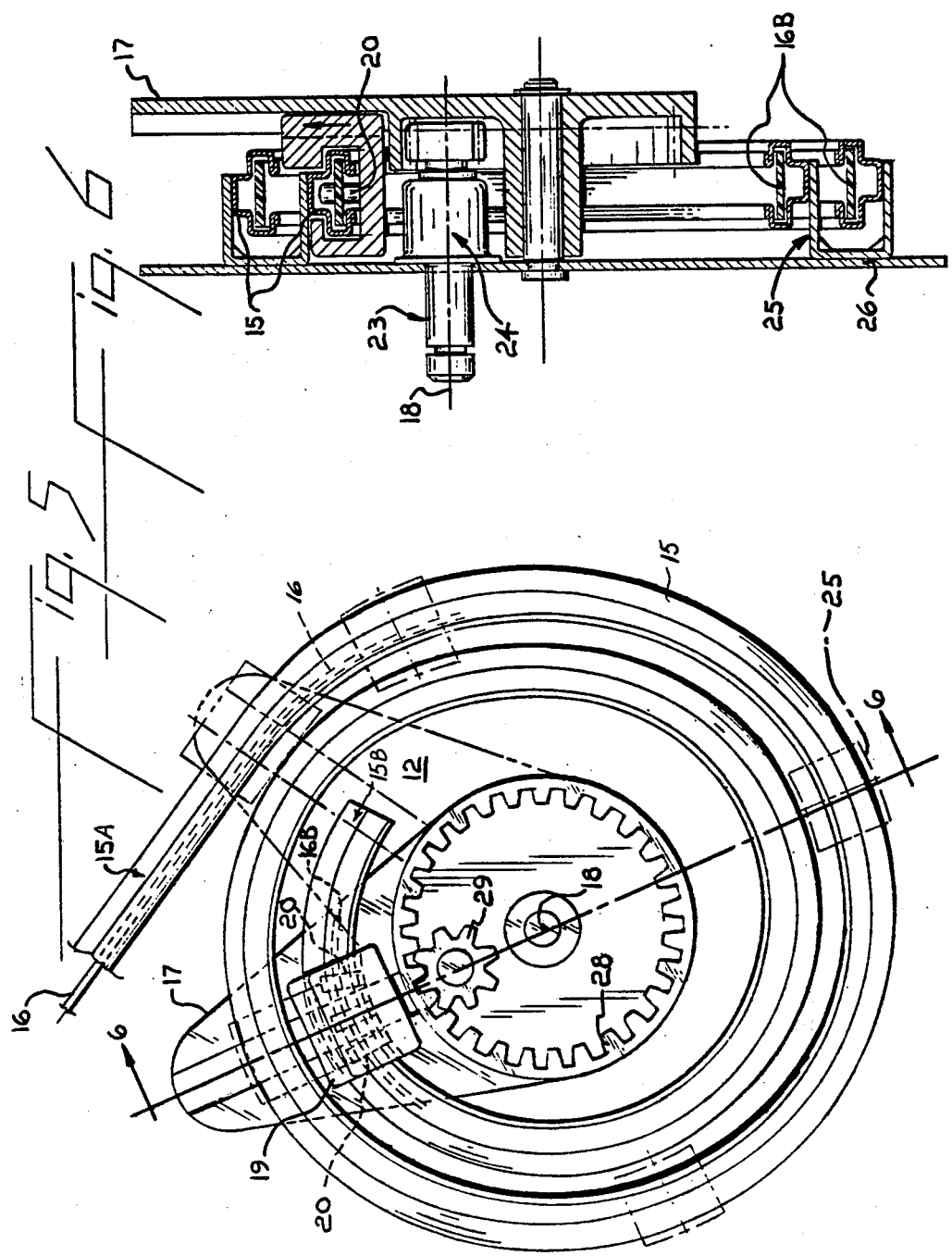

WINDOW REGULATOR

BACKGROUND OF THE INVENTION

In typical automobile door window installations, the portion of the door below the window opening serves as a storage well for the window when the latter is open and as a housing for the window regulator mechanism which moves the window between the open and closed positions. A wide variety of window regulator devices has been proposed for opening and closing such windows. In recent years, with the weight reduction necessary for increased energy efficiency, the design of window regulator devices has changed substantially. One change has involved the incorporation of a polymeric tape as the primary power transmission element. Such devices typically involve the interaction of a perforated tape and a sprocket moving the tape along a track. However, the perforated tape, with extended use, is subject to failure, and a continuing need exists to further reduce the width of the window regulator mechanism. Such a reduction in width has not been possible with the tape perforations that have previously been required.

SUMMARY OF THE INVENTION

The present invention provides an improved mechanism which permits the use of a solid, substantially non-perforated polymeric tape which can also can be narrower than the polymeric tapes previously used.

Specifically, the instant invention provides a rotary input regulator adapted to move a closure between open and closed positions comprising a rigid track having a first end parallel to the direction of movement of the closure and a second end formed in a spiral configuration; a polymeric tape situated within the track and having a first end attached to the closure and a second end positioned within the portion of the track formed in a spiral configuration; a power transmission arm having one end rotatably mounted in the center of the spiral configuration; a drive block connected to the second end of the polymeric tape and slideably connected to both the power transmission arm and the track so as to move the second end of the tape within the end of the track formed in a spiral configuration with rotation of the power transmission arm; and a rotary input means attached to the rotatably mounted end of the power transmission arm.

BRIEF DESCRIPTION OF THE DRAWINGS

FIGS. 1 and 2 are side views of an automobile door, partly cut away to show an apparatus of the present invention, FIG. 1 showing the window in the closed position and FIG. 2 showing the window in the open position.

FIG. 3 is a side view of one embodiment of an apparatus of the present invention.

FIG. 4 is a cross-sectional representation of the embodiment of the invention shown in FIG. 3 taken at section 4—4.

FIG. 5 is a side view of another embodiment of the present invention.

FIG. 6 is a cross-sectional representation of the embodiment of the invention shown in FIG. 5 taken at section 6—6.

DETAILED DESCRIPTION OF THE INVENTION

In FIGS. 1 and 2 there is shown an automobile body 10 having a left front door 11 having a window 12 adapted for generally vertical movement between a closed position shown in FIG. 1 and an open position shown in FIG. 2. A rotary input regulator device according to the present invention, generally designated as 13, has a polymeric tape 16 having first and second ends designated 16A and 16B, respectively. First end 16A is attached to the lower portion of the window by attaching means 14. The window regulator device has a track 15, with a first end 15A parallel to the direction of movement of the window and a second end 15B at least part of which is formed into a spiral configuration.

The details of the present invention can be better seen in FIG. 3 in which track 15 contains polymeric tape 16. The second end of the polymeric tape 16B is positioned within the portion of the track formed in a spiral configuration. A power transmission arm 17 is rotatably mounted in the center 18 of the spiral configuration. A drive block 19 is connected to the second end of the polymeric tape and slideably connected to both the power transmission arm 17 and the track end 15B so as to move the second end of the tape within the end of the track formed in a spiral configuration with rotation of the power transmission arm about its fixed end. The track can be formed from a wide variety of materials, including metals and thermoplastics or combinations thereof. In general, metal components will be formed by shaping metal sheet while thermoplastic components will be formed by molding the material at elevated temperatures.

FIG. 4 is a cross-sectional representation of the embodiment of the invention shown in FIG. 3, taken at section 4—4. In that Figure, the drive block 19 is attached to the end of the polymeric tape 16B by means of pins 20 passing through perforations in the end of the polymeric tape. The tape thus travels through track 15 which is provided with longitudinal apperture 21 through which the tape is attached to the drive block. The power transmission arm 17 is rotatably mounted at point 22, and is connected with the input shaft 23 through clutch means 24. The clutch means is preferably provided to prevent actuation of the window regulator system by application of force to the window. Clutch means of the types well known in the art can be used. The input shaft to the clutch means can be rotatably actuated by means such as a crank, handle or motor. The rigid track is supported by brackets 25 which are attached in turn to mounting plate 26 which can be mounted by appropriate means to a vehicle or other framework.

The present apparatus preferably further comprises means to counterbalance the weight of the window being raised or lowered. In the embodiment shown in FIGS. 3 and 4, this is accomplished by torsion spring 27 which is connected to the power transmission arm at the point of rotative attachment 18 and to the mounting plate at fixed attachment 30.

In the embodiment of the invention shown in FIGS. 5 and 6, a mechanical advantage or a reduction of required input shaft torque is attained by the use of gears. The internal gear 28, which may be formed as a part of arm 17, is driven by pinion 29 which is attached to the output of clutch 24. A counterbalance torsion spring, not shown, can be provided in this embodiment also.

The present mechanism provides reliable operation for opening and closing a vehicle window, particularly since a substantially solid or unperforated tape can be used for the entire length of the track as opposed to the perforated tape previously used in the art. Moreover, the use of the substantially solid tape, perforated only at the points of attachment on the ends of the tape, can be at least about 25-35% narrower while providing equivalent performance. This reduced width requirement for the tape, and consequently the track, is particularly important in automotive constructions where space in the door is at a premium and is often required for internal structure components which protect the vehicle's occupants from side impact. In addition, the reduction in track width results in a reduced weight for the overall mechanism. The apparatus of the present invention also provides a varying force output for the same torque input during the opening-closing cycle with a higher force as the window approaches the closed position. This helps to seal out wind noise on closing the window or loosening an ice-frozen window or other opening. This is a function of the positioning of the drive block near the fixed end of the power transmission arm when the window or other closure is at or near the closed position, providing the increased force.

While the present apparatus has been described primarily as a window regulator device, it can also be used in a variety of other applications in which rotary power is converted to linear power, as will be evident to those skilled in the art. Such applications include, for example, garage door and sliding door openers.

I claim:

1. A rotary input type regulator adapted to move a closure between opened and closed positions comprising a rigid track having a first end parallel to the direction of movement of the closure and a second end formed in a spiral configuration; a polymeric tape situated within the track and having a first end attached to the closure and a second end positioned within the portion of the track formed in a spiral configuration; a power transmission arm having one end rotatably mounted in the center of the spiral configuration; a drive block connected to both the second end of the polymeric tape and slideably connected to the power transmission arm and the track so as to move the second end of the tape within the end of the track formed in a spiral configuration with rotation of the power transmission arm; and a rotary input means attached to the rotatably mounted end of the power transmission arm.

2. A regulator device of claim 1 wherein the rotary input means is attached to the power transmission arm through clutch means.

3. A regulator device of claim 1 wherein the closure is a vehicle mounted window.

4. A regulator device of claim 1 wherein the polymeric tape is substantially solid or unperforated.

5. A regulator device of claim 1 wherein the weight of the closure is counterbalanced by a torsion spring.

* * * * *